United States Patent [19]
Lee

[11] Patent Number: 5,381,186
[45] Date of Patent: Jan. 10, 1995

[54] VIDEO SIGNAL DECODER MUTING CIRCUIT AND METHOD OF MUTING

[75] Inventor: Gi-seok Lee, Suwon, Rep. of Korea

[73] Assignee: Samsung Electronics Co., Ltd., Kyungki, Rep. of Korea

[21] Appl. No.: 132,852

[22] Filed: Oct. 7, 1993

[30] Foreign Application Priority Data

Mar. 31, 1993 [KR] Rep. of Korea .................... 93-5194

[51] Int. Cl.6 ............................................. H04N 5/60
[52] U.S. Cl. .................................... 348/738; 348/466; 348/632; 371/57.2; 371/47.1
[58] Field of Search ............... 348/484, 632, 738, 462, 348/466; H04N 5/60; 371/47.1, 57.1, 57.2, 61, 67.1

[56] References Cited

U.S. PATENT DOCUMENTS 4,763,339 8/1988 Sutphin et al. ..................... 370/106
5,170,396 12/1992 Rivers et al. ....................... 371/57.2

FOREIGN PATENT DOCUMENTS 0497280 8/1992 European Pat. Off. ........ H04N 5/60
0268369 10/1989 Japan ............................. H04N 5/60

Primary Examiner—James J. Groody
Assistant Examiner—Jeffrey S. Murrell
Attorney, Agent, or Firm—Leydig, Voit & Mayer

[57] ABSTRACT

A mute circuit of a MUSE decoder can remove noise produced in the changing of channels in a multi-broadcast receiver and includes a synchronizing signal comparator for comparing the audio frame synchronizing signal of a received signal with a standard frame synchronizing signal and producing a comparison result, an unequal bit number detector for receiving the comparison result and detecting the number of non-matching synchronizing bits per frame, and a mute controller for controlling a mute operation according to the detected number of non-matching synchronizing bits per frame. Also, in a method employing the above components, after having detected the number of non-matching bits of the audio frame synchronizing signal, the time for muting process is determined according to the detected number. Thus, excessive errors in a received signal and noise produced when changing channels can be removed completely.

24 Claims, 11 Drawing Sheets

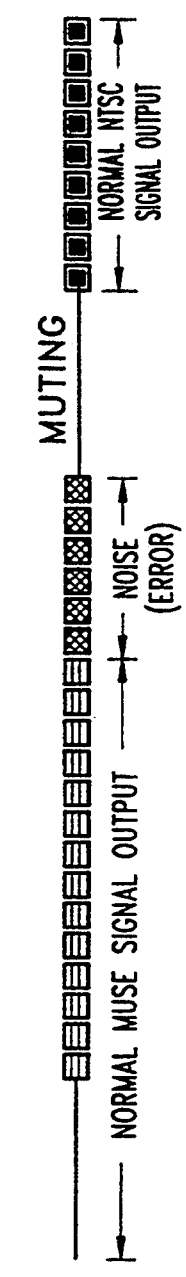
FIG. 3A (PRIOR ART)
FIG. 3B (PRIOR ART)
FIG. 3C (PRIOR ART)
FIG. 3D (PRIOR ART)
FIG. 3E (PRIOR ART)

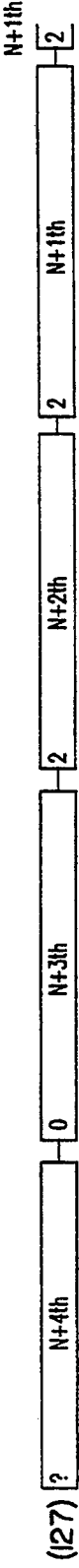
FIG. 12A
FIG. 12B
FIG. 12C
FIG. 12D
FIG. 12E
FIG. 12F
FIG. 12G

VIDEO SIGNAL DECODER MUTING CIRCUIT AND METHOD OF MUTING

BACKGROUND OF THE INVENTION

The present invention relates to a multi-broadcast receiver which receives the transmitted signals of a multi-broadcast system and, more particularly, to a mute circuit of a multiple sub-Nyquist sampling encoder (MUSE) decoder which can remove noise produced during the changing of channels in a multi-broadcast system.

A multi-broadcast receiver receives MUSE signals identical to national television system committee (NTSC) signals or high-definition television (HDTV) signals according to a conventional broadcast mode. The multi-broadcast receiver includes decoders for decoding the selected signal according to a selected channel.

FIG. 1 is a block diagram of a MUSE decoder in a multi-broadcast receiver.

Referring to FIG. 1, the MUSE decoder comprises an analog-to-digital (A/D) converter 11 which converts a received signal into a digital signal, a level controller 12 which controls automatically the level of the digitized signal from A/D converter I 1, a video signal processor 13 which processes video signals in the received signal, a controlling signal detector 14 which uses a phase-locked loop and a controlling signal to output a frame pulse, a MUSE signal and an NTSC signal, an audio sampling converter 15 for converting an audio sample, a time expander 16 which expands time for restoring an audio signal where time has been compressed, a signal detector 17 which detects a frame synchronizing signal and an audio controlling signal from sampled audio signals, a D/A converter 18 which converts the audio signal produced in signal detector 17 into an analog signal, and a mute controller 19 which controls the mute operation according to the audio mute signal provided by signal detector 17 and the frame pulse signal of controlling signal detector 14.

Here, the processing of the audio signals in the MUSE decoder having the above components is explained.

Since an audio signal of a MUSE signal encoded for transmission is inserted into a video signal to be transmitted, the audio signal is synchronized with the video sampling rate to be transmitted. The restoration of the audio signal is accomplished by audio sampling converter 15 and time is expanded by time expander 16 so that the signals are restored as the signals having existed before being compressed. Therefore, the restored signal is applied to signal detector 17.

Signal detector 17 recognizes only a 16-bit signal as the synchronizing signal determined by the encoder of a transmitter, and thereby recognizes the beginning of a frame of the audio signal. Then, the decoding process in a frame unit begins. Here, if the signal detector does not recognize a frame synchronization, the decoded signal is produced not as a normal signal but as noise, which is an error.

Accordingly, the decoded result should be muted if the frame synchronization is not recognized.

FIG. 2 is a block diagram of a muting circuit of a MUSE decoder in a conventional multi-broadcast receiver.

The conventional mute circuit of the MUSE decoder comprises, as illustrated in FIG. 2, a latch 221 which consecutively receives frame synchronizing signals of the respective frame of an audio signal in the form of 16-bit serial data, standard synchronizing signal storage means 22 which IC, stores a 16-bit standard synchronizing signal stipulated by a transmitter, an exclusive OR operator 23 which performs an exclusive OR operation using each bit of the frame synchronizing signal and of the standard synchronizing signal, first and second NAND gates 24 and 25 which receive respectively the lower and upper eight bits of the frame synchronizing signal or the standard synchronizing signal (which are compared by the exclusive OR operator) so as to perform a NAND operation using the received bits, a logical adder 26 which performs an OR operation using the outputs of first and second NAND gates 24 and 25, a control clock generator 27 which counts a 1.35 MHz clock signal which controls latch 21 to produce one control clock pulse per sixteen input pulses, and a mute signal generator 28 which produces a mute signal by detecting a synchronizing error bit from logical adder 26 according to the control clock.

FIGS. 3A-3E show various signals for explaining the mute operation according to the conventional method. In FIG. 3A, a frame pulse represents the initiation of a frame. Further, FIG. 3B is a MUSE/NTSC channel converting signal, and FIG .3C shows a mute operating signal for performing mute operation in a frame pulse, and FIG. 3D shows a MUSE audio signal before the decoding process and an NTSC signal produced according to the frame pulse. FIG. 3E shows a normal MUSE signal, noise produced during the decoding process, the mute interval produced according to the mute operating signal and the NTSC signal.

The mute operation according to the above conventional mute circuit will be described with reference to FIGS.2 and 3A-3E.

When the MUSE/NTSC channel converting signal is produced as shown in FIG. 3B, latch 21 receives the frame synchronizing signal of the 16 bit audio signal and exclusive OR operator 23 performs an exclusive OR operation using the respective bits of the received synchronizing signal and the standard synchronizing signal from standard synchronizing signal storage means 22, to output the results thereof. Then, first and second NAND gates 24 and 25 perform a NAND operation using the outputs of exclusive OR operator 23 and logical adder 26 performs an OR operation using the results of the two NAND gates to output the results. Mute signal generator 28 receives the above logical result to detect errors by determining that the frame synchronization occurs only when the 16-bit audio synchronizing signals match. Here, if a sequence of plural frames are in synchronization, the frame is fixed, such that a normal NTSC audio signal (FIG. 3E) is produced. On the other hand, when the frame synchronization is fixed, if the audio frame synchronization is not identical in sequence, the audio synchronizing signals of eight continuous frames are compared in order to determine whether the error therein causes the result and then the current channel is converted into the NTSC channel.

The conventional mute circuit according to the above described method compares the audio synchronizing signals of eight frames at most in converting the MUSE/NTSC channel so that, when comparing the signals, the NTSC signal produced by above NIUSE/NTSC converting signal 32 is produced as noise.

SUMMARY OF THE INVENTION

To solve the problem, an object of the present invention is to provide a mute circuit which detects the number of non-matching bits among audio frame synchronizing signals and controls a mute operation depending on the detected number, so as to remove noise and errors when changing channels.

Another object of the present invention is to provide a mute method which detects the number of non-matching bits among the audio frame synchronizing signals and controls the mute operation depending on the detected number.

To accomplish the first object, in a mute circuit of a MUSE decoder of a multi-broadcast receiver, there is provided a mute circuit comprising a synchronizing signal comparator which compares the audio frame synchronizing signal of a received signal with a standard frame synchronizing signal and outputs a comparison result, an unequal bit number detector which receives the comparison result and detects the number of synchronizing bits per frame which do not match, and a mute controller which controls mute operation according to the detected number of nonmatching synchronizing bits per frame.

To accomplish the other object, there is provided a mute method according to the present invention comprising time steps of comparing the frame synchronizing signal of a received audio signal with a standard frame synchronizing signal, detecting the number of synchronizing bits per frame which do not match using the result of the signal comparing step, and controlling mute operation depending on the detected numbers of non-matching synchronizing bits per frame.

BRIEF DESCRIPTION OF THE DRAWINGS

The above objects and other advantages of the present invention will become more apparent by describing in detail a preferred embodiment thereof with reference to the attached drawings in which:

FIGS. 3A to 3E show signals for explaining mute operation according to the conventional method;

FIG. 12 shows the various signals according to the operation of a mute circuit of the present invention.

DETAILED DESCRIPTION OF THE INVENTION

Herein, referring to the attached drawings, one embodiment of a mute circuit according to the present invention is described in more detail.

Figure 4:
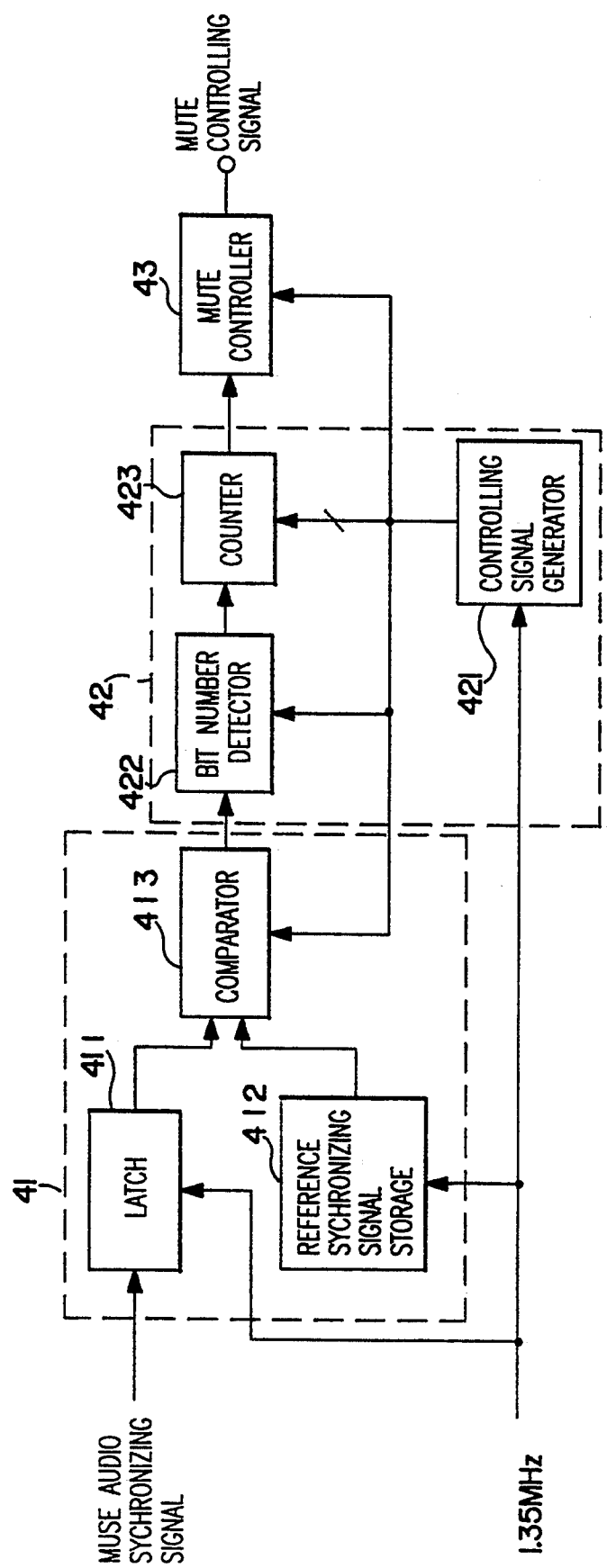
FIG. 4 is a block diagram of a mute circuit according to the present invention.

FIG. 4 is a block diagram of the mute circuit according to the present invention.

As illustrated in FIG. 4. the mute circuit according to the present invention includes a synchronizing signal comparator 41 which compares the frame synchronizing signal of a received audio signal with a standard frame synchronizing signal, an unequal bit number detector 42 which receives the result of the signal comparison and detects the number of synchronizing bits per frame which do not match. and a mute controller 43 which controls mute operation depending on the detected number of non-matching synchronizing bits.

Synchronizing signal comparator 41 includes a latch 411 for serially receiving the frame synchronizing signal of a received audio signal, standard synchronizing signal storage means 412 for storing a standard synchronizing frame signal, a comparator 413 for comparing the serially received synchronizing signal with time standard synchronizing signal.

Unequal bit nun-thor detector 42 includes a controlling signal generator 421 for producing a clock pulse per each frame of the audio signal, a bit number detector 422 for detecting the number of non-matching synchronizing bits of the compared synchronizing signal of each frame for producing the controlling signal, and a counter 423 for counting the detected number of non-matching synchronizing bits whenever the controlling signal is produced.

Figure 5:
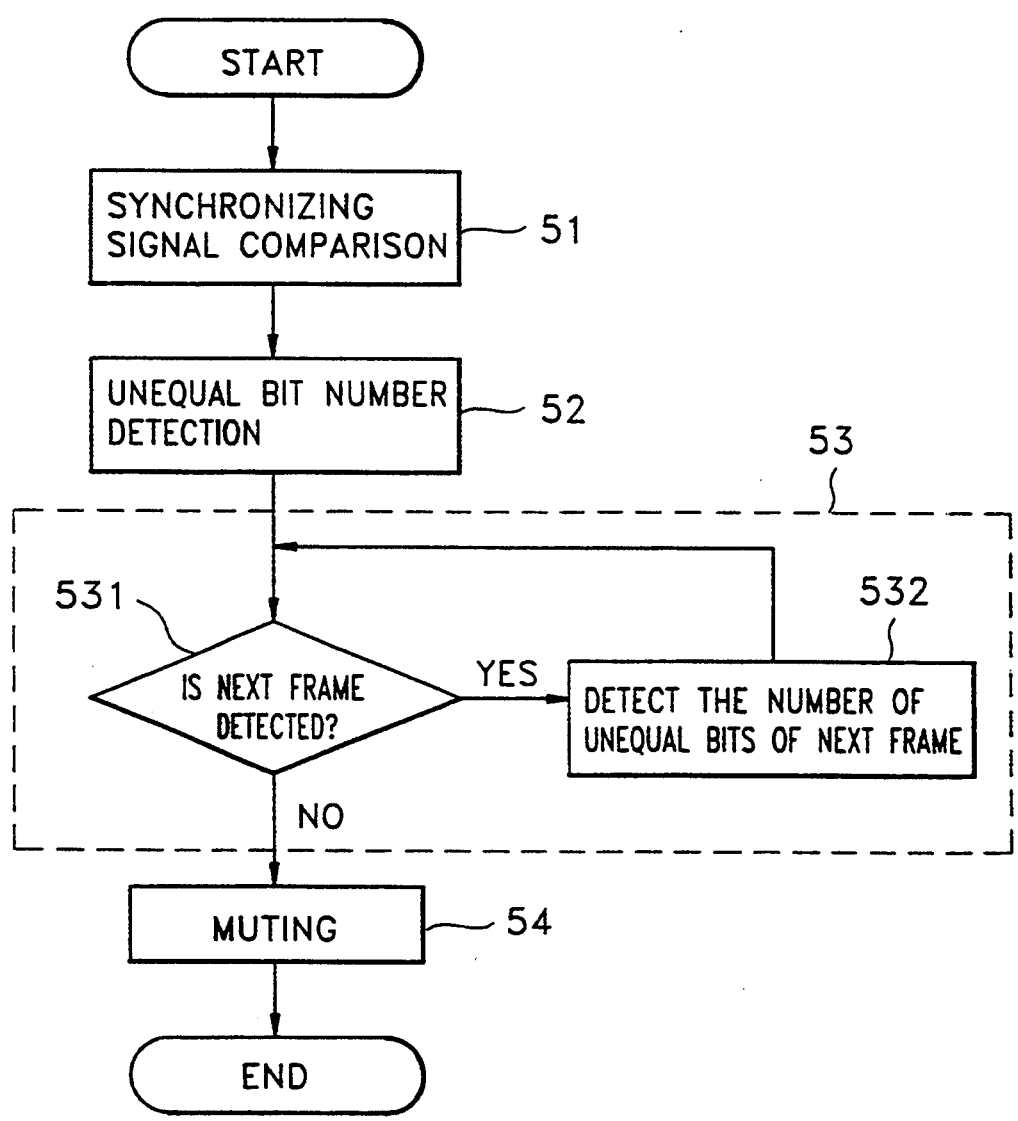
FIG. 5 is a flowchart of a method of a mute circuit according to the present invention.

FIG. 5 is a flowchart for illustrating the steps of a mute method according to the present invention.

In FIG. 5, a step 51 is a synchronizing signal comparison process for comparing the frame synchronizing signal of a received audio signal with a standard frame synchronizing signal, a step 52 is an unequal bit number detection process for detecting the number of non-matching synchronizing bits per frame of the compared synchronizing signals, a step 53 is a next frame detection process for detecting the number of non-matching bits of the next frame depending on the above detected number of non-matching bits, and a step 54 is a muting process for performing a mute operation according to all of the above detected numbers of non-matching bits.

The next frame detection process of step 53 consists of a step 531 for determining whether the; number of non-matching bits of the next frame should be detected or not according to the results of step 52, and a step 532 for detecting the number of non-matching bits in the next frame if it is determined that the number of non-matching bits of the next frame should be detected in step 531.

Here, referring to FIGS. 4 and 5, the mute circuit having the above components and the mute method according to the present invention are described in more detail.

In step 51 of FIG. 5, latch 411 of above synchronizing signal comparator 41 receives each frame synchronizing signal of a received audio signal. Then, in step 52, comparator 413 serially compares each bit of each frame synchronizing signal of the above audio signal with that of the standard synchronizing signal, so as to detect non-matching bits and produce them as an output. Also, in step 531, according to the controlling signal produced in controlling signal generator 421, the number of non-matching synchronizing bits of the synchronizing signal of each compared frame is detected, and counter 423 counts the number of non-matching bits detected whenever the controlling signals are generated and outputs the result.

In step 532, if it is determined that the number of non-matching bits of the next frame should be detected in step 531 based on the number of non-matching bits detected, mute controller 43 redetermines the number of non-matching bits of the next frame, so that if the number of non-matching bits is greater than the predetermined number, the mute process is performed therein, and otherwise, the number of non-matching bits is detected. According to the detected number of non-matching bits in the method, the time for muting is determined.

Figure 6:
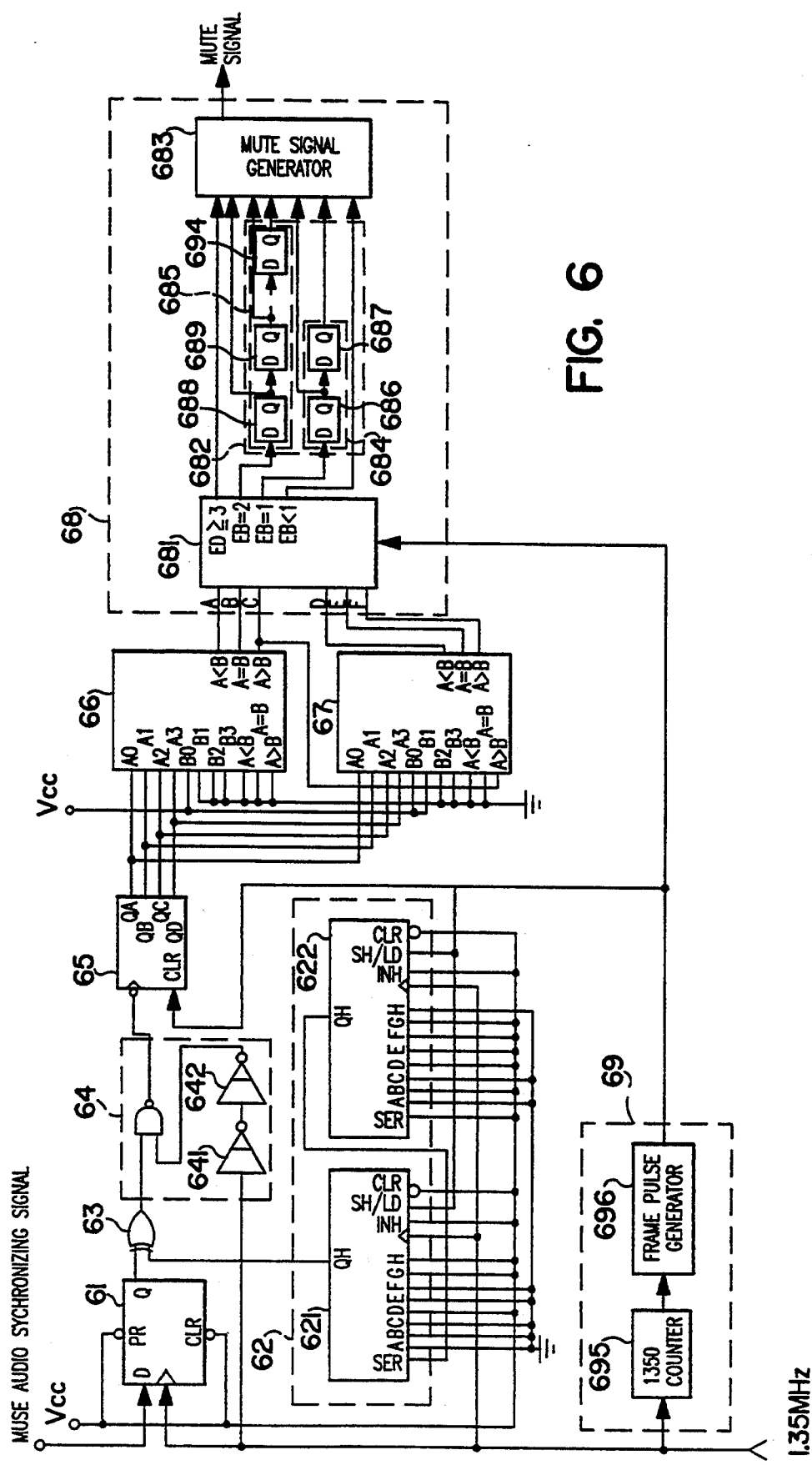
FIG. 6 is a block diagram of the mute method according to one embodiment of the mute circuit of the present invention.

FIG. 6 is a block diagram of another embodiment of the mute circuit according to the present invention.

The mute circuit comprises a first latch 61 for latching a MUSE audio synchronizing signal according to the standard clock signal, a standard synchronizing signal storage circuit 62 for storing a standard audio synchronizing signal, an exclusive OR gate 63 for sequentially performing exclusive OR operations using each bit of the audio synchronizing signal provided by first latch 61 and those of a standard synchronizing signal and producing the result, a NAND operator 64 for performing a NAND operation using the output from exclusive OR gate 63 and a standard clock, a counter 65 for counting the number of non-matching bits of the two synchronizing signals according to the output from NAND operator 64 and producing a binary result, a first comparator 66 for comparing the binary output of counter 65 with a decimal value "1," a second comparator 67 for comparing the binary output of counter 65 with a decimal value "3," a mute controller 68 for controlling the mute operation according to the respective output results of first and second comparators 66 and 67, and a controlling signal generator 69 for counting the standard clock to generate one frame pulse per frame.

Standard synchronizing signal storage circuit 62 includes a first register 621 for storing the upper eight bits of a standard audio synchronizing signal, and a second register 622 for storing the lower eight bits thereof.

NAND operator 64 further includes inverting transmission gates 641 and 642 for transmitting the standard clock.

Mute controller 68 includes a state detector 681 for receiving the restricts of the comparison operation performed by first and second comparators 66 and 67 and producing four logic state outputs (i.e., less than one (EB<1), equal to one (EB=1), equal to two (EB=2) and three or more (EB≧3)) according to the number of non-matching bits, a second latch 682 for latching the bit state of the frame according to the result from state detector 681, and a mute signal generator 683 wherein normal signal output results (no muting) when the number of non-matching bits is zero, when the number of non-matching bits is three or more, a muting operation is performed, and when the number is equal to 1 or 2, the states of the non-matching bits of eight frames at most are detected and the mute signals are generated.

Second latch 682 includes a third latch 684 for latching the signal which represents the number of non-matching bits in the current frame when the determined number of non-matching bits is equal to two, and a fourth latch 685 for latching the signals which represent the number of non-matching bits of the next seven frames in sequence when the determined number of non-matching bits is one.

Third latch 684 includes a fourth latch 686 for latching the signal representing the number of next non-matching bits, and a fifth latch 687 for latching the signal representing the number of non-matching bits after the next.

Fourth latch 685 includes seven latches 688 through 694 for latching serially the signals representing tile numbers of non-matching bits of the seven frames.

The controlling signal generator 69 includes a modular 1350 counter 695 which receives the standard clock to perform modular 1350 counting, and a frame pulse generator 696 for generating a frame pulse.

Figure 7:
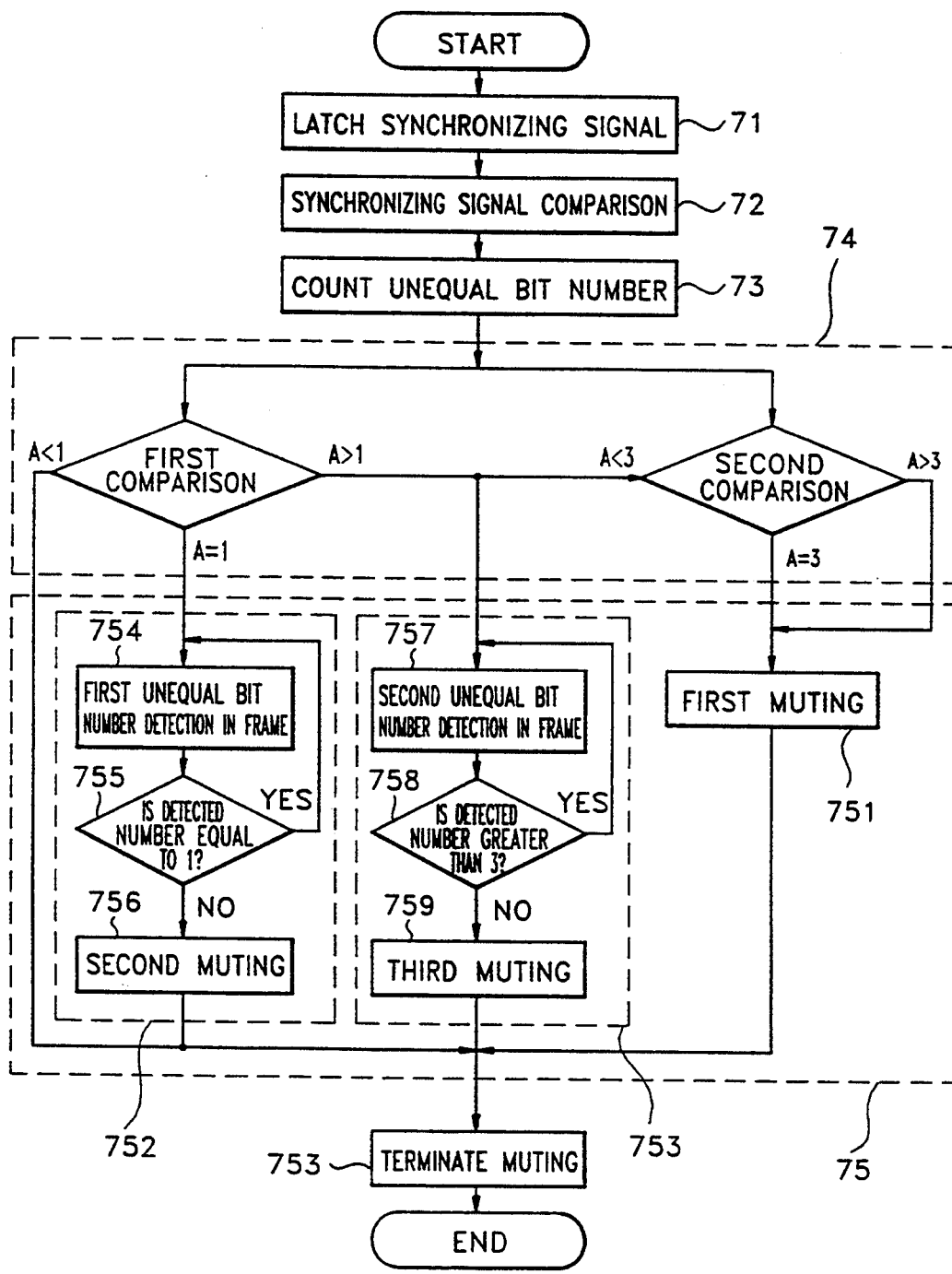
FIG. 7 is a flowchart of the mute method according to another embodiment of the mute circuit of the present invention.

FIG. 7 is a flowchart of a mute method according to another embodiment of the present invention.

Referring to FIG. 7, a step 71 is for latching a MUSE audio synchronizing signal serially according the standard clock signal. A step 72 is for comparing each bit of the latched audio synchronizing signal with those of the standard synchronizing signal, by sequentially performing exclusive OR operations using both of the signals. A step 73 is for counting the number of non-matching bits of both synchronizing signals according to the compared signals, to thus output a binary result. A step 74 is for comparing the counted number of non-matching bits with the stored number therein. A step 75 is for controlling the mute operation according to the detected number of non-matching bits. A step 76 is for terminating the muting operation after controlling the mute operation.

The unequal bit number comparison process of step 74 includes a step 741 for comparing the binary result of step 73 with a decimal value "1," and a step 742 for comparing the same binary result with a decimal value "3."

The mute controlling process of step 75 includes a step 751 for performing the mute operation when the number of non-matching bits resulting from step 74 is three or more, a step 752 for receiving the number of non-matching bits in the next seven frames when the result of step 741 is "A=1" and comparing the received numbers, and a step 753 for receiving the number of non-matching bits of the next frame when step 74 determines that the detected number of non-matching bits is two (A>1 and A<3), and then detecting the number of non-matching bits.

The first signal processing of step 752 includes a step 754 for detecting the number of non-matching bits of the next frame when the detected number of non-matching bits is equal to one, a step 755 for determining whether the detected number of non-matching bits in the next frame is equal to one, and step 756 for performing a mute operation if it is determined that the number is not equal to one.

The second signal processing of step 753 includes a step 757 for detecting the number of non-matching bits in the next frame when the results of step 74 determine that the number of non-matching bits is two, a step 758 for determining whether the result of adding the non-matching bits of sequential frames is greater than three, and a step 759 for performing a mute operation when it is determined in step 758 that the result is three or more.

Figure 8:
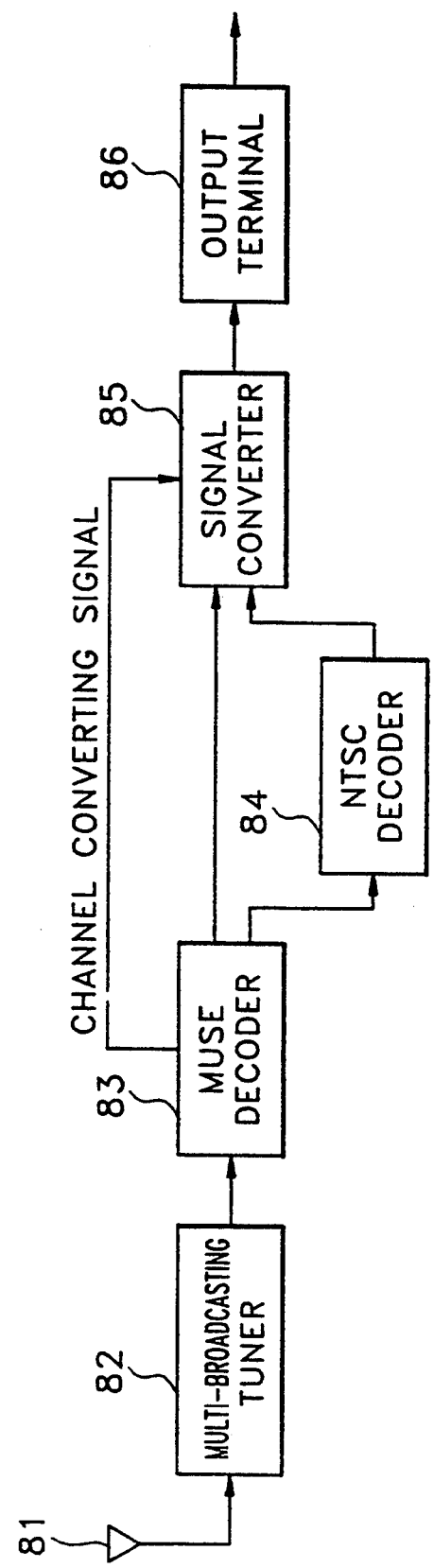
FIG. 8 is a block diagram of the multi-broadcast receiver.

FIG. 8 is a block diagram of a multi-broadcast receiver.

As illustrated in FIG. 8, the multi-broadcast receiver includes an antenna 81 for receiving the transmitted signals of a multi-broadcast system, a multi-broadcast tuner 82 for selecting the received channel, a MUSE decoder 83 for decoding a MUSE signal, an NTSC decoder 84 for decoding an NTSC signal, a signal converter 85 for selecting one of the two decoded signals, and an output terminal 86 for outputting the selected broadcast signal.

Figure 9:
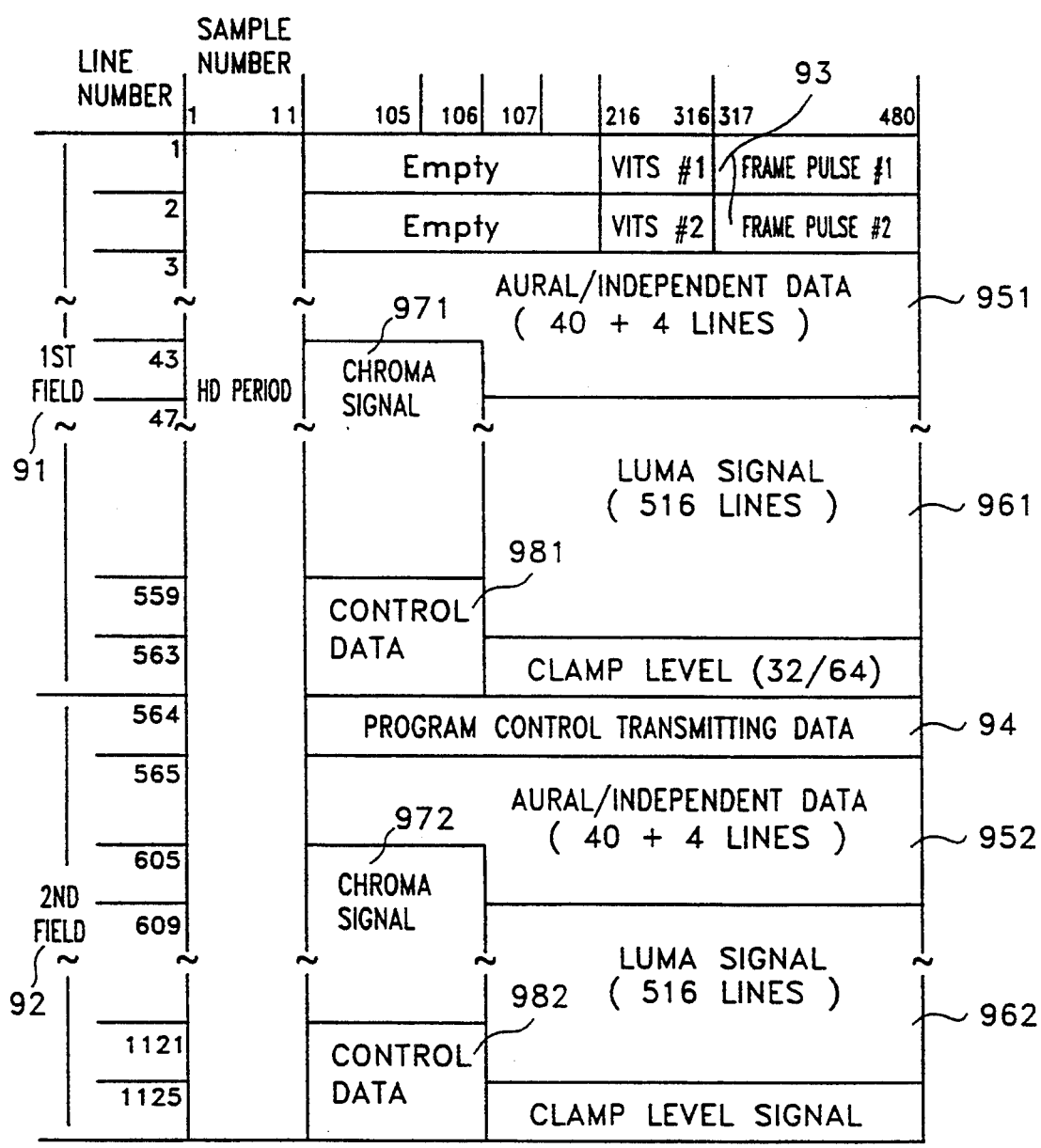
FIG. 9 is a structural view of one frame of a MUSE signal.

FIG. 9 is a view of the structure of the MUSE signal of one frame.

A MUSE signal frame is divided into a first field 91 and a second field 92 as illustrated in FIG. 9. Here, frame pulses 93 are formed in the first and second lines of first field 91 and program control transmitting data 94 is located in the starting line (564th) of the second field, with each field including an audio/data spacing of 44 lines (indicated by reference numerals 951 and 952), a luminance signal spacing of 516 lines (indicated by reference numerals 961 and 962), chrominance signals 971 and 972, and control data 981 and 982, respectively.

Figure 10:
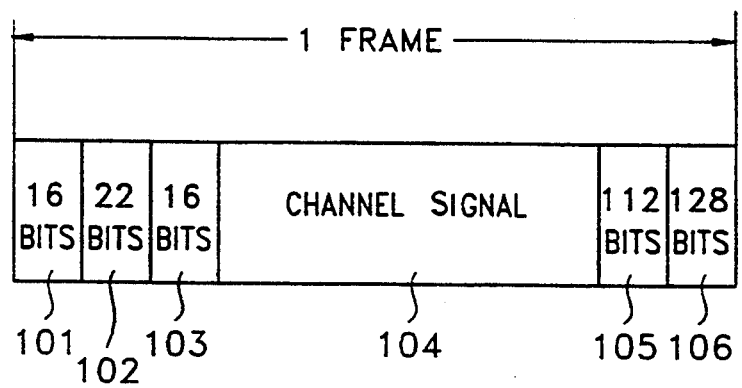
FIG. 10 is a structural view of MUSE audio signal of one frame included in a MUSE signal.

FIG. 10 is a view of the structures of the MUSE audio signals of one frame, which are included in the MUSE audio signal.

As shown in FIG. 10, each frame of a MUSE audio signal includes a 16-bit frame synchronizing signal 101, a 22-bit control signal 102, a 16-bit range code 103, a channel signal 104, independent data 105 formed of 112 bits, and a 128-bit error correction code 106.

Figure 11A:
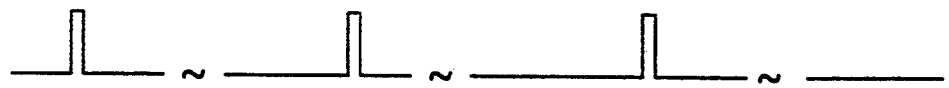
FIGS. 11A to 11D show signals for explaining the mute operation of the present invention.
Figure 11B:
Figure 11C:
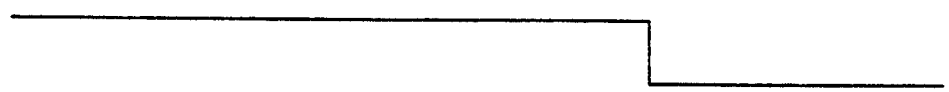
Figure 11D:
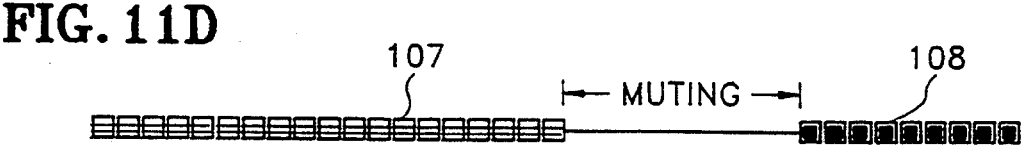

FIGS. 11A to 11D show the signals in order to explain the mute operation according to the present invention. Here, FIG. 11A is a frame pulse for representing the initiation of the frame, FIG. 11B is a MUSE/NTSC channel converting signal, and FIG. 11C is a mute operating signal according to the frame pulse of FIG. 11A. FIG. 11D shows a MUSE signal (107), an NTSC signal (108), and the muting interval, which are converted by the MUSE/NTSC channel converting.

FIG. 12 is a view of various signals in a mute circuit according to the present invention.

Referring to FIG. 12, shown are an audio synchronizing signal 121, an audio frame pulse 122, a standard synchronizing signal 123, a 1.35 MHz clock signal 124, an unequal bit signal 125 for representing the non-matching bits and output from exclusive OR gate 63, a count signal 126 representing the number of non-matching bits counted by counter 65, and a signal 127 for representing the number of non-matching bits detected in each frame. (Herein, ↑ represents the non-matching bits).

Hereinbelow, the mute circuit having the above components and the mute method according to still another embodiment of the present invention are explained in more detail.

Figure 1:
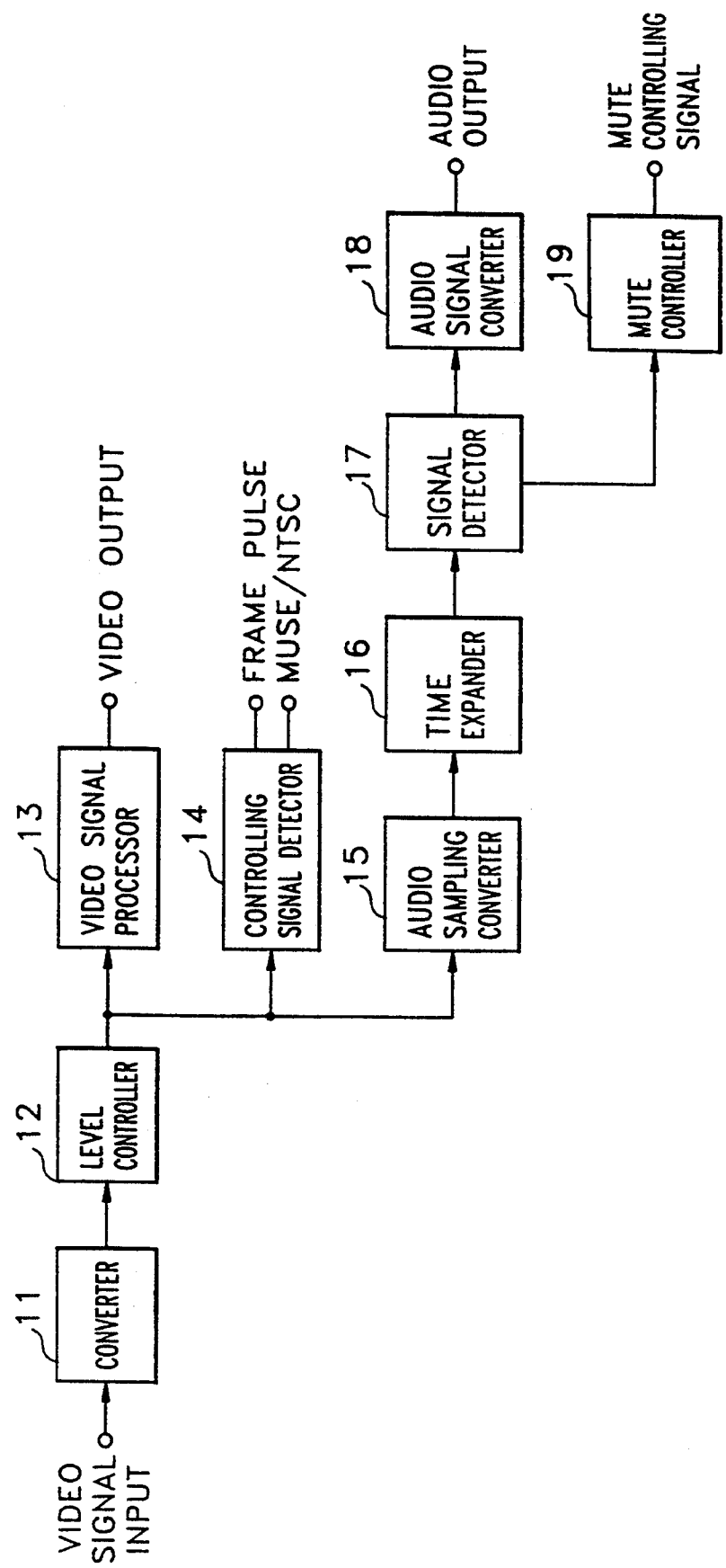
FIG. 1 is a block diagram of a MUSE decoder of a multi-broadcast receiver which can be employed according to the prior art and the present invention.
Figure 2:
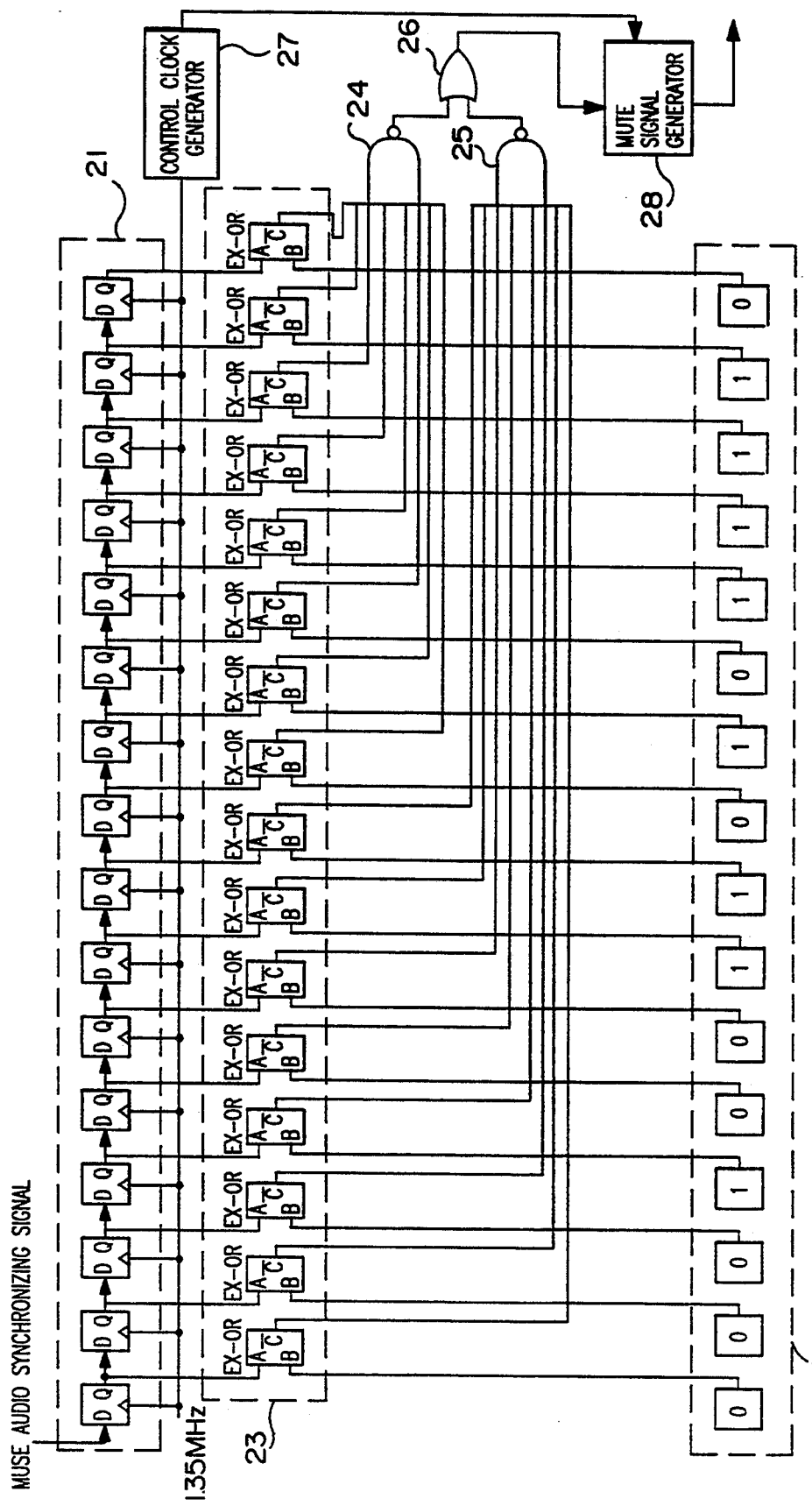
FIG. 2 is a block diagram of a mute circuit of a MUSE decoder of the conventional multi-broadcast receiver.

The MUSE signal having been encoded to be transmitted has a video frame period of two fields as a basic unit as illustrated in FIG. 9. Where 480 samples are formed in each line, an aural signal occupies 40+4 lines which include forty lines from the 3rd to 42th lines having the 107th through 480th samples among the samples existing therein and four lines from the 43th to 46th lines having the 107th through 480th samples, and an aural datum is inserted in the second field, occupying 40+4 lines from the 565th line in the same way of the first field. The above audio signal is restored by time expander 16 shown in FIG. 1 to the signal in the state wherein time is not condensed, and the restored signal occupies one field period. The restored signal is illustrated in FIG. 10.

Referring to FIGS. 6 and 7, first latch 61 receives synchronizing data composed of 16 bits among the MUSE audio signal and latches the 1.35 MHz clock, to produce the result in step 71. Then, in step 72, exclusive OR gate 63 compares each bit of the standard synchronizing signal produced in standard synchronizing signal storage circuit 62 with that of the audio frame synchronizing signal, so as to produce a logic low when the synchronizing patterns input thereto are not identical. NAND operator 64 performs a NAND operation of the consecutively compared signals and to the standard clock to produce a result. In step 73, counter 65 receives the gated signal in order to detect the number of non-matching bits according to the output signal of controlling signal generator 69, so as to produce a binary result. In step 74, first comparator 66 compares the number of non-matching bits counted by counter 65 with the decimal value "1," so as to produce logic signals representing the states when the compared number is less than, equal to or greater than one, via respective output terminals, while second comparator 67 performs a similar operation with respect to the decimal value "3."

In step 75, state detector 681 detects the number of non-matching bits using the output signals of first and second comparators 66 and 67 so as to produce an output state from respective terminals, when the detected number is less than one, equal to one, equal to two, or equal to three.

Here, the mute signal generator 683 finishes the mute operation in mute ending 76 when the detected number of the unequal bits is less than 1, and performs the mute operation in the step of first mute process 751 when the detected number is 3 or above. When the detected number of the unequal bits is equal to 1, unequal bit number detection in the first frame 754 in the step of first signal processing 752 detects the number of the unequal bits in the next seven frames, at most. When the numbers of the unequal bits of next frames are equal to 1, using latches 688 through 694, the mute operation in second mute process 756 is performed. When the number of unequal bits is 2, the state of the number of the current unequal bits is latched using latches 686 and 687 and the number of the unequal bits of the next frame is received, so that if the number of the unequal bits of the sequential frame is greater than 3, the mute operation is performed in third mute operation 759.

Here, the number of non-matching bits of the serial audio synchronizing data is detected in mute controller 68, to control the mute operation according to the number of non-matching frame synchronizing bits. That is, the signals of eight frames produced by first and second comparators 66 and 67 are received therein and the mute determination is made. This method is performed in accordance with Table 1.

TABLE 1

| number of N non-matching bits in current frame | 3 or more | equal to 3 | equal to 2 | equal to 1 | equal to 0 |
| --- | --- | --- | --- | --- | --- |
| N-1th | X | X | 2 or more | 1 or more | 1 or more |
| N-2th | X | X | X | 1 or more | 1 or more |

TABLE 1-continued

| number of N non-matching bits in current frame | 3 or more | equal to 3 | equal to 2 | equal to 1 | equal to 0 |
|---|---|---|---|---|---|
| N-3th | X | X | X | X | 1 or more |
| N-4th | X | X | X | X | 1 or more |
| N-5th | X | X | X | X | 1 or more |
| N-6th | X | X | X | X | 1 or more |
| N-7th | X | X | X | X | 1 or more |
| N-8th | X | X | X | X | 1 or more |
| result | muting at once | muting at once | 2-frame comparison | 3-frame comparison | 8-frame comparison | normal output without muting |

(In Table 1, N represents the current frame, X represents the condition independent of the number of the unequal bits of the corresponding frame, N-nth represents the condition detecting the number of the unequal bits of the nth frame before the unequal bits of the current frame are produced.)

Referring to Table 1, when the number of non-matching bits of a current frame is three or more, normally decoding operation is impossible due to the presence of excessive errors. It means a noise condition and since the receiving condition is extremely poor (possibly due to the reception of a non-MUSE signal, e.g. an NTSC signal), the mute operation is performed immediately such that errors or noise is not produced. If the number of non-matching bits among the 16-bit frame synchronizing signal is two, a few errors are generated, but if the errors number greater than two, errors are generated after having restored aural signals so that the mute operation is performed when two errors in two sequential frames are generated. Here, since the time expansion needed after having detected the frame synchronizing signal until controlling muting is greater than two frame periods, the errors are not produced ultimately, even if the process is controlled after comparing two successive frames. Also, in the case of four or more non-matching bits of two or three successive frames, errors are generated. In other cases, an error correction operation is performed, so that the mute operation is performed when the number of non-matching bits in the current frame is four or more in three successive frames. Here, since the time expansion from having detected the frame synchronizing signal to controlling muting is two frame periods, the mute control is performed after having compared three frames so that an error corresponding to one frame is not muted as a final output. However, this error is somewhat compensated by an interpolation function in the human auditory system. When the number of non-matching bits is one, the mute control is performed in the case of errors that are sequentially accumulated by frames in a relatively good receiving condition. Also, when the number of accumulated errors is less than eight, the error correction operation is not performed, but when the sequentially accumulated errors amount to at least eight, muting is performed. When no non-matching bits are produced, the operation is recognized as being in a normal receiving state so that the final output is produced directly, without muting.

Accordingly, the mute circuit and method according to the present invention removes excessive errors in received signals and removes errors and noise generated when changing channels.

What is claimed is:

1. In a video signal decoder, a mute circuit comprising:

a synchronizing signal comparator for comparing an audio frame synchronizing signal of including data bits in a received signal with a standard frame synchronizing signal the standard frame synchronizing signal including a predetermined number of synchronizing bits per frame and producing a comparison signal in response;

an unequal bit number detector which receives the comparison signal for detecting the number of synchronizing bits per frame in the audio frame synchronizing signal of the received signal and the standard audio frame synchronizing signal that do not match; and a mute controller for controlling muting in response to the number of synchronizing bits per frame that do not match.

2. The mute circuit as claimed in claim 1 wherein said synchronizing comparator comprises:

a first latch for serially receiving the audio frame synchronizing signal of the received signal;

standard synchronizing signal storage means for storing the standard frame synchronizing signal; and a comparator for consecutively comparing the audio frame synchronizing signal of the received signal with the standard frame synchronizing signal.

3. The mute circuit as claimed in claim 2 wherein said standard synchronizing signal storage means comprises:

a first register for storing the upper eight bits of a sixteen bit standard frame synchronizing signal; and a second register for storing the lower eight bits of the standard synchronizing signal.

4. The mute circuit as claimed in claim 2 wherein said comparator comprises an exclusive OR gate for sequentially performing exclusive OR operations using each bit of the audio frame synchronizing signal from said first latch and each bit of the standard frame synchronizing signal.

5. The mute circuit as claimed in claim 1 wherein said unequal bit number detector comprises:

a controlling signal generator for producing one clock pulse per frame of an audio signal;

a bit number detector receiving the comparison signal for detecting the number of non-matching synchronizing bits of the synchronizing signal of each frame and producing a controlling signal in response; and a counter receiving the clock pulse from said controlling signal generator and the controlling signal for counting the detected number of non-matching synchronizing bits when the controlling signal is produced.

6. The mute circuit as claimed in claim 5 wherein said controlling signal generator comprises a modulo 1350 counter receiving the standard clock for modulo 1350 counting.

7. The mute circuit as claimed in claim 5 wherein said bit number detector includes a NAND operator which performs a NAND operation using the output of said exclusive OR gate and a standard clock.

8. The mute circuit as claimed in claim 7 wherein said NAND operator comprises two serially connected inverting transmission gates to transmit the standard clock.

9. The mute circuit as claimed in claim 5 wherein said counter comprises a comparator.

10. The mute circuit as claimed in claim 9 wherein said comparator comprises:
a first comparator for comparing the number of non-matching bits mounted by said counter with 1 non-matching bit; and
a second comparator for comparing the number of non-matching bits with 3 non-matching bits.

11. The mute circuit as claimed in claim 10 wherein said mute controller comprises:
a state detector for receiving the compared signals produced by said first and second comparators and producing an output signal in one of four states according to the number of unequal bits; and
a mute signal generator for producing no muting when the number of unequal bits is 0, for producing muting when the number of the unequal bits is at least 3, for determining, when the number of unequal is bits 2, the number of unequal bits in the next frame, and for producing muting and detecting the number of non-matching bits in eight frames when the number of unequal bits is 1.

12. The mute circuit as claimed in claim 11 wherein said mute signal generator includes a second latch for latching the bits in the frame in response to the state detector.

13. The mute circuit as claimed in claim 12 wherein said second latch comprises:
a third latch for latching the signal representing the number of the unequal bits in the current frame when the detected number of unequal bits is 2; and
a fourth latch for latching serially signals representing the numbers of the unequal bits in the next seven frames when the detected number of the unequal bits is 1.

14. The mute circuit as claimed in claim 13 wherein said third latch comprises:
a fourth latch for latching a signal representing the number of unequal bits in the next seven frames; and
a fifth latch for latching a signal representing the number of the unequal bits in the frame after the next seven frames.

15. The mute circuit as claimed in claim 14 wherein said fourth latch comprises seven latches for latching the numbers of the unequal bits in seven serial frames.

16. A mute method wherein a mute circuit comprises a synchronizing signal comparator for comparing an audio frame synchronizing signal of a received signal with a standard frame synchronizing signal, an unequal bit number detector for receiving the compared synchronizing signal to detect the number of unequal synchronizing bits per frame, and a mute controller for controlling muting according to the detected number of unequal bits comprising the steps of:
comparing a frame synchronizing signal of a received audio signal with a standard frame synchronizing signal;
detecting the number of unequal synchronizing bits per frame of the compared synchronizing signals;
detecting the number of unequal bits in the next frame according to the detected number of unequal bits; and
muting according to the detected number of unequal bits;

17. The mute method as claimed in claim 16 wherein comparing a frame synchronizing signal comprises the steps of:
sequentially latching MUSE audio synchronizing signals based on a standard clock signal; and
comparing each bit of a latched audio synchronizing signal with a standard synchronizing signal by means of consecutively performing an exclusive OR operation for both signals.

18. The mute method as claimed in claim 16 wherein detecting the number of unequal synchronizing bits comprises the steps of:
counting the number of unequal bits of the two compared synchronizing signals to produce a binary result; and
comparing the counted number of unequal bits with the number already received.

19. The mute method as claimed in claim 18 wherein comparing the counted number of unequal bits comprises the steps of:
comparing the number of unequal bits with 1 bit; and
comparing the binary number of unequal bits with 3 bits.

20. The mute method as claimed in claim 16 wherein detecting the number of unequal bits comprises:
determining whether the number of unequal bits of the next frame should be detected according to the number of the unequal bits detected previously; and
detecting the number of unequal bits in the next frame if it is determined that the number of unequal bits of the next frame should be detected.

21. The mute method as claimed in claim 20 wherein determining whether the number of unequal bits of the next frame should be detected comprises the steps of:
first signal processing of the number of unequal bits of the next seven sequential frames when the detected number of unequal bits is 1; and
second signal processing of the number of unequal bits of the next frame when the detected number of the unequal bits is 2.

22. The mute method as claimed in claim 24 wherein the first signal processing comprises the steps of:
detecting the unequal bit number in the next frame when the detected number of the unequal bits is 1; and
determining whether the detected number of unequal bits in the next frame is 1.

23. The mute method as claimed in claim 21 wherein said second signal processing comprises the steps of:
detecting the unequal bit number in the next frame when the detected number of the unequal bits is 2; and
determining whether the result of adding the detected numbers of the unequal bits is at least 3.

24. The mute method as claimed in claim 16 wherein said mute process comprises the steps of:
performing the mute operation when the detected number of unequal bits is at least 3;
performing the mute operation if the number or unequal bits is not 1;
performing the mute operation if the number of unequal bits is at least 3 ; and
end muting when the detected number of the unequal bits is 0.

* * * * *

UNITED STATES PATENT AND TRADEMARK OFFICE
CERTIFICATE OF CORRECTION

PATENT NO. : 5,381,186
DATED : January 10, 1995
INVENTOR(S) : Lee

It is certified that error appears in the above-indentified patent and that said Letters Patent is hereby corrected as shown below:

Column 10, Line 16, delete "of";

Line 18, change "signal the" to --signal, the--;

Line 20, change "bits per frame and" to --bits per frame, and--;

Line 46, before "synchronizing" insert --frame--;

Column 11, Line 15, change "mounted" to --counted--;

Column 12, Line 53, change "said" to --the--;

Line 59, change "said mute process" to --muting--;

UNITED STATES PATENT AND TRADEMARK OFFICE
CERTIFICATE OF CORRECTION

PATENT NO. : 5,381,186
DATED : January 10, 1995
INVENTOR(S) : Lee

Page 2 of 2

It is certified that error appears in the above-indentified patent and that said Letters Patent is hereby corrected as shown below:

Column 12, line 66, change "end" to --ending--.

Signed and Sealed this

Twenty-fifth Day of April, 1995

Attest:

BRUCE LEHMAN

*Attesting Officer*    *Commissioner of Patents and Trademarks*